United States Patent [19]
Faulhaber et al.

[11] 4,063,879
[45] Dec. 20, 1977

[54] TRANSFER PRINTING OF CELLULOSIC FABRICS AND TRANSFER FOR USE THEREIN

[75] Inventors: Gerhard Faulhaber, Bad Duerkheim; Hugo Fuetterer, Ludwigshafen; Harro Petersen, Frankenthal; Hermann Schwab, Ludwigshafen, all of Germany

[73] Assignee: BASF Aktiengesellschaft, Ludwigshafen, Germany

[21] Appl. No.: 649,634

[22] Filed: Jan. 16, 1976

[30] Foreign Application Priority Data
Jan. 23, 1975 Germany .................. 2502590

[51] Int. Cl.$^2$ .................. D06P 5/20; D06P 5/22
[52] U.S. Cl. .................. 8/2.5 A; 8/2.5 R; 101/470; 428/537; 428/913
[58] Field of Search .................. 8/2.5 A, 2.5 R; 101/470; 428/913, 537

[56] References Cited

U.S. PATENT DOCUMENTS

| | | | |
|---|---|---|---|
| 3,536,490 | 10/1970 | Hochberg | 96/47 |
| 3,708,261 | 1/1973 | Kasper et al. | 8/116.3 |
| 3,782,896 | 1/1974 | Defago et al. | 8/2.5 |
| 3,918,895 | 11/1975 | Mizuno | 8/2.5 |

OTHER PUBLICATIONS

Salvin, V. S., The Sublimation Problem in Permanent Press Finishing, American Dyestuff Reporter, June 5, 1967, pp. 31–35.

Primary Examiner—Stanford M. Levin
Attorney, Agent, or Firm—Keil, Thompson & Shurtleff

[57] ABSTRACT

A process for the transfer printing of fabrics containing or consisting of cellulose fibers, by using transfers, wherein the fabric is impregnated with aqueous solutions of compounds which are both solvents for the transfer dyes and potential crosslinking agents for cellulose, dried and printed by the transfer process, in the presence of a cross-linking catalyst, applied from a transfer, with sublimable dyes or optical brighteners.

8 Claims, No Drawings

TRANSFER PRINTING OF CELLULOSIC FABRICS AND TRANSFER FOR USE THEREIN

The present invention relates to a process for the transfer printing of cellulose fabrics, and union fabrics containing cellulose fibers, by using transfers, wherein the fabric is impregnated with aqueous solutions of compounds which are both solvents for the transfer dyes and potential crosslinking agents for cellulose, dried and printed by the transfer process, in the presence of a crosslinking catalyst, with sublimable dyes or optical brighteners, the catalyst being present in a transfer.

As a rule, cotton is dyed or printed with reactive dyes or vat dyes; the use of disperse dyes is unsuccessful because these dyes lack affinity for cellulose.

Transfer printing, the principle of which is described, e.g., in French Pat. No. 1,223,330 and German Published Application No. 1,769,757, requires dyes which sublime at from 160° to 220° C and thereby pass from the transfer onto the substrate. Such dyes are essentially to be found amongst disperse dyes but these, as stated, have no affinity for cellulose.

It is an object of the present invention to provide a simple process for durably fixing the subliming dyes in or on cellulose.

We have found that this object is achieved by the use of assistants which are both solvents for the dye and potential crosslinking agents for the cellulose.

Such assistants, are, e.g., bifunctional or polyfunctional methylolated and etherified urea derivatives or melamine derivatives, and carbamates. In particular, the ethyl, propyl or butyl ethers and, preferably, the methyl ethers may be used. The assistants advantageously carry at least 2, but preferably more, methylol-ether groups. Melamine derivatives are therefore preferred.

Specifically, the following may be mentioned as examples of groups of compounds which can be used as the assistants:

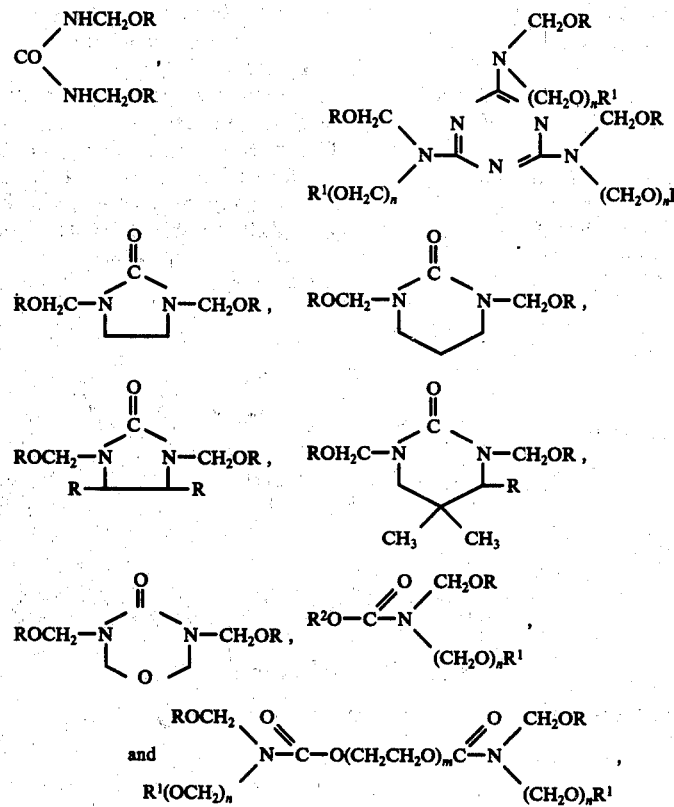
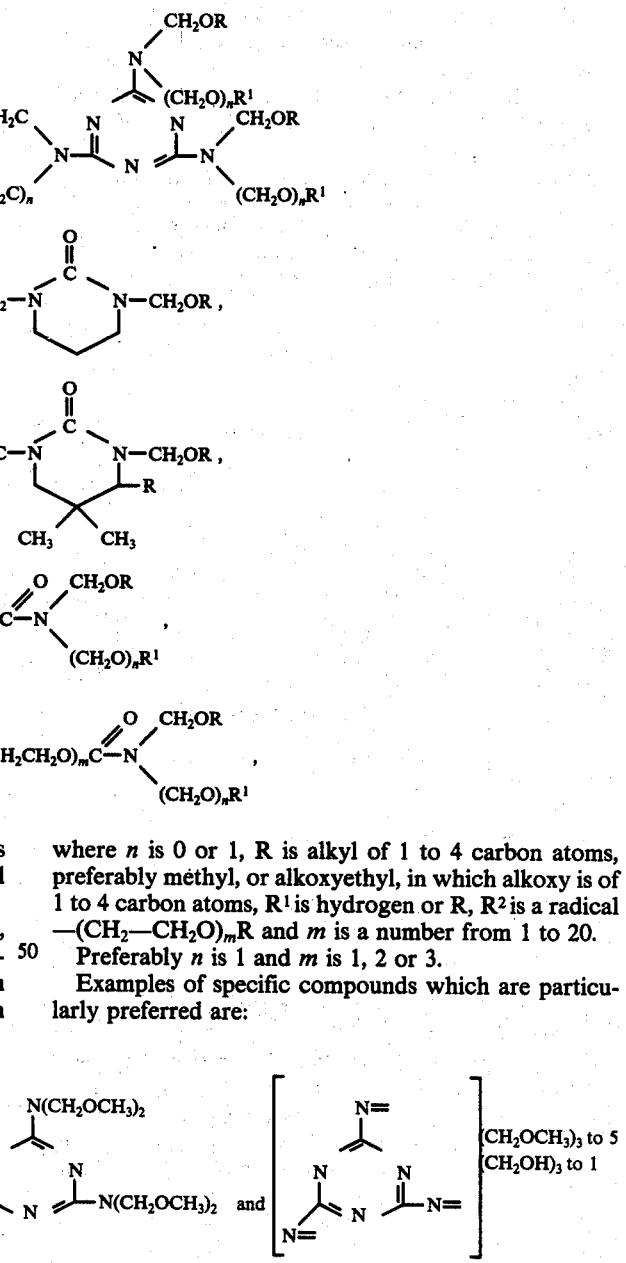

where $n$ is 0 or 1, R is alkyl of 1 to 4 carbon atoms, preferably methyl, or alkoxyethyl, in which alkoxy is of 1 to 4 carbon atoms, $R^1$ is hydrogen or R, $R^2$ is a radical $-(CH_2-CH_2O)_m R$ and $m$ is a number from 1 to 20.

Preferably $n$ is 1 and $m$ is 1, 2 or 3.

Examples of specific compounds which are particularly preferred are:

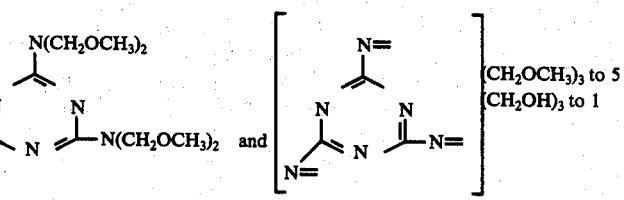

The use of one of the above melamine derivatives together with a carbamate of the above formulae, where R is, in particular, methyl, and $m$ is from 1 to 3, is particularly preferred.

The use of carbamates unsubstituted at the nitrogen in combination with the melamine derivatives is of advantage, and combination with the other compounds mentioned is possible.

Other assistants which influence, e.g., the hand of the goods and the dye uptake, may also be present. Examples of these are oxyethylation products and polymers, such as those mentioned, e.g., in German Published Application No. 2,458,660.

Catalysts to be mentioned, which initiate the crosslinking reaction, are in particular acidic or potentially acidic compounds, such as are used, e.g., in resin finishing of cellulose, i.e. acids, metal halides or nitrates, and ammonium salts. Examples are magnesium chloride, ammonium chloride, triethanol ammonium chloride, tributylammonium chloride, 1,3-diaminopropanol hydrochloride, ammonium nitrate, zinc nitrate, ammonium thiocyanate, maleic acid, acetic acid, tartaric acid and fumaric acid.

Examples of catalysts preferred for industrial usage are $NH_4Cl$, $MgCl_2$, maleic acid, $NH_4NO_3$, $Zn(NO_3)_2$, $ZnCl_2$ and $Mg(NO_3)_2$.

Examples of sublimable dyes are those disclosed e.g. in German Published Application Nos. 1,769,757, 1,771,813, 1,771,812, 2,309,131 and 2,300,487.

Specific examples are the following dyes: C.I, 11,855, 58,900, 11,110, 60,755, 62,015, 61,505, 61,100, 61,105, Reaction of the assistant, and crosslinking, which take place prematurely, i.e. before the dye has diffused into the substrate, must be avoided because the assistants used according to the invention thereby lose their solvent properties. Since premature reaction could occur even during the actual transfer process, the catalyst is not applied together with the assistant, but only later.

It has proved expedient to employ the catalyst in the following ways:

1. Use of a second transfer, (in addition to the actual transfer used for printing), which contains the catalyst and which is employed either on the side which faces the substrate side which is to be printed, or is employed between the first transfer and the heating equipment, or 2. Use of a transfer which contains both the dye and the catalyst.

The protective paper frequently used during calendering may, in case 1, serve as the second transfer.

The transfers in case 2 may contain the catalyst as a constituent of the printing ink or may be provided with the catalyst, e.g. by spraying, before or after the transfer is printed. Preferably, the catalyst is applied to the back of the transfer if the latter consists of a permeable material, e.g. paper.

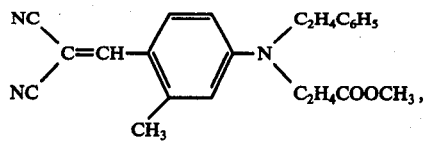

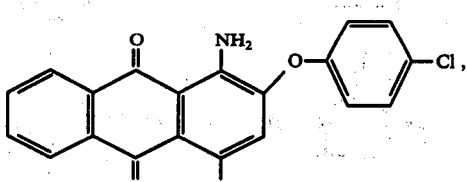

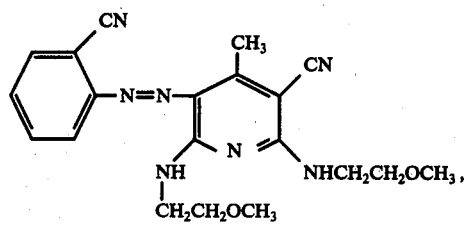

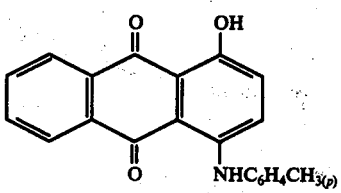

and 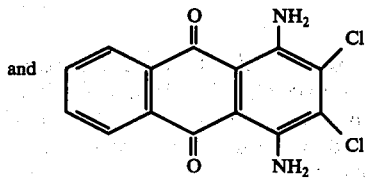

Examples of suitable optical brighteners are disclosed in German Published Application No. 1,769,761.

The new process is expediently carried out by treating the fabric containing cellulose fibers with an aqueous liquor which contains the assistant. The concentration of the assistant must be suitably chosen for the type of fabric. In principle, the criteria developed for resin finishing of cellulose can be applied. The composition of a typical padding liquor is 80 parts of assistant and 920 parts of water.

After application of the assistant, the substrate is dried, the temperature being so chosen that no reaction of the assistant occurs. Drying temperatures are normally in the range of from 70° to 110° C.

After drying, the substrate is ready for the transfer printing process, which may be carried out continuously or batchwise in the conventional manner.

A sufficient amount of catalyst for fixing the dye is as a rule from 0.5 to 3 g per square meter of substrate. The amounts of assistant depend on the substrate and are, in the case of pure cotton, from about 5 to 25%, based on the weight of substrate; in the case of blended fabric, the amount is reduced in accordance with its composition, quantities close to the upper limit being advantageous.

Union fabrics are in particular mixtures of cotton and polyesters (e.g. 50:50 or 33:67) and cotton and polyamides.

German Published Application No. 2,337,798 discloses a process by means of which cellulose fibers can be transfer-printed with disperse dyes in the presence of a swelling agent for cellulose. To achieve wash-fast fixing of the prints, a two-stage process is necessary, since the prints obtained by the transfer process are initially not wash-fast and must be fixed by application of crosslinking agents.

Using the new process and the assistants according to the invention, the dye can be taken up, and fixed, in a single process stage.

The French and German specifications named above are incorporated herein by reference.

In the Examples which follow, parts and percentages are by weight.

EXAMPLE 1

A paper is flexographically printed with an ink which consists of 10 parts of the yellow dye C.I. No. 11,855, 5 parts of ethylcellulose, 70 parts of ethyl alcohol, 20 parts of ethyl acetate and 5 parts of ethylglycol, and the print is dried. The back of the paper is then sprayed evenly with a solution of 100 g of $MgCl_2.6H_2O$ in 900 ml of water so as to apply 15 g of the solution per $m^2$. The transfer is then dried.

A union fabric of polyester and cotton in the ratio of 67:33, weighing about 90 g per square meter, is impregnated with a liquor which consists of 75 parts of a highly methylolated melamine highly etherified with methanol, and 925 parts of water (liquor pick-up 80%) and is then dried at 90° C.

The printed paper is placed with the printed side on the fabric which has been treated as described above, and this combination is pressed in a sheet press for 30 seconds at 200° C under 4 kg/cm², the paper facing the heated upper platen of the press.

A deeply colored light-fast print in which both the polyester and the cotton fibers have been dyed evenly and tone-on-tone is obtained. The print is fast to dry cleaning in trichloroethylene and to washing in the presence of commercial detergents at 60° C. A non-impregnated polyester/cotton blended fabric which is transfer-printed in the same way shows an uneven print since the cotton fibers take up virtually no dye.

Similar results are obtained if instead of the highly methylolated, highly etherified malamine the same amount of a tetramethylolmelamine tetramethyl ether or the same amount of a mixture of the highly methylolated, highly etherified melamine with N,N-dimethylol-β-butyldiglycol carbamate in the weight ratio of 2 : 1 is used.

EXAMPLE 2

A paper is gravure-printed with an ink which consists of 6 parts of the dye C.I. No. 62,015, 20 parts of a styrene polymer and 79 parts of toluene and the print is dried, to give transfer 1.

A union fabric of polyester and cotton in the ratio of 67 : 33, weighing 180 g per square meter, is sprayed on one side with a liquor which consists of 100 parts of N,N'-dimethoxymethyl-4,5-dimethoxyethyleneurea and 900 parts of water. The amount of liquor applied is 150 g/m². The fabric is dried in hot air at 100° C.

A body paper weighing 20 g per square meter is sprayed with 5 g/m² of a 20% strength aqueous solution of ammonium chloride, and dried, to give transfer 2.

The transfer 1, treated fabric and transfer 2 are arranged as a sandwich, with the treated fabric lying between transfer 1 (of which the printed side faces the fabric) and transfer 2; this combination is passed through a transfer calender at 220° C, with a residence time of 45 seconds, the transfer 1 facing the heating equipment. A deeply colored print which is fast to washing and dry cleaning, and in which polyester fibers and cotton fibers are dyed evenly tone-on-tone, is obtained.

If an untreated polyester/cotton union fabric is used and in other respects the procedure described above is followed, an uneven and pale print is obtained, since only the polyester constituent of the fabric takes up the dye.

Similar results are obtained if transfer 2 is treated with the same amount of magnesium chloride, or ammonium nitrate, or zinc nitrate, in place of ammonium chloride.

EXAMPLE 3

A paper is printed, by rotary screen printing, with an ink which consists of 30 parts of the dye C.I. No. 61,505, 370 parts of water, 400 parts of a 10% strength locust bean ether thickener and 200 parts of a 10% strength starch ether thickener, and the print is dried, to give transfer 1.

A cotton satin weighing 170 g per square meter is impregnated with a liquor which consists of 100 parts of a highly methylolated melamine highly etherified with methanol, 50 parts of methoxyethyl carbamate and 850 parts of water (liquor pickup 100%), and is dried at 100° C.

A body paper weighing 25 g per square meter is sprayed with 8 g/m² of a 20% strength aqueous solution of hydrated magnesium chloride and is dried, to give transfer 2.

Treated fabric and transfers are placed on top of one another in the sequence fabric, transfer 1 (printed side facing the fabric) and transfer 2, and the assembly is treated in a heated press for 40 seconds at 210° C under 2 kg/cm², with transfer 2 facing the heating equipment.

A deeply colored level print is obtained, which is fast to dry cleaning and to washing at 60° C using commercial detergents.

If the above procedure is followed but a non-impregnated cotton satin is used in place of the impregnated fabric, the surface of this satin is merely slightly speckled after the transfer process; the cotton takes up virtually no dye.

EXAMPLE 4

A transfer printing paper which contains — due to its process of manufacture — 2 g/m² of triethanolamine hydrochloride is offset-printed with an ink which consists of 10 parts of the dye of the formula

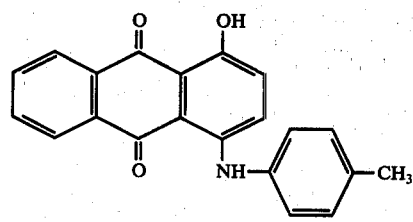

and 90 parts of a varnish composed of 40 parts of phenol-modified rosin, 20 parts of vegetable drying oils, 10 parts of a long-oil alkyd resin, 25 parts of mineral oil and 5 parts of Aerosil.

A union fabric of polyester and cotton in the ratio 50 : 50, weighing 120 g per square meter, is impregnated with a liquor which consists of 120 parts of dimethoxymethyl-urea and 880 parts of water (liquor pick-up 90%) and is dried at 80° C.

The printed paper is placed with the printed side on the fabric and the combination is treated in a heated press for 30 seconds at 220° C under 3 kg/cm², with the printed paper facing the heating equipment.

A deeply colored print is obtained, in which the cotton constituent and polyester constituent are dyed evenly and in the same shade, and which is fast to washing and dry cleaning.

Similar results are achieved if the dimethoxymethylurea is partially or completely replaced by a highly methylolated melamine highly etherified with methanol, the total amount of assistant remaining the same.

A print with similar properties is obtained if, in the above example, the methoxyethyl carbamate is replaced by the same amount of N,N-dimethylol-β-methoxyethyl carbamate or by the same amount of N,N-dimethoxymethyl-β-methoxyethyl carbamate.

Instead of the mixture of the highly methylolated highly etherified melamine and methoxylated carbamate, the same amount of a co-condensate of 1 mole of melamine, 1 mole of methoxyethyl carbamate and 6 moles of formaldehyde, highly etherified with methanol, can be employed, and gives the same results.

EXAMPLE 5

A paper is sprayed with sufficient of a 10% strength aqueous zinc nitrate solution to apply about 2 g of zinc nitrate per square meter, and is dried. The paper is then printed as described in Example 2, but using the dye C.I. No. 61,105.

A cotton poplin weighing 120 g per square meter is printed overall, on one side, by rotary screen printing with a paste of 100 parts of tetramethoxymethylmelamine, 50 parts of N,N'-bis-ethoxymethyl-urone, 5 parts of the ammonium salt of a lightly crosslinked precipitation polymer of acrylic acid as a thickener, and 845 parts of water, and is dried at 100° C. The amount of solids applied is about 15 g/m².

The printed paper is placed with its printed side on the print-receiving side of the treated poplin and the combination is treated in a transfer calender at 220° C, using a residence time of 45 seconds, with the paper facing the heating equipment of the calender.

A deeply colored, level print which is fast to washing and dry cleaning is obtained.

A non-impregnated cotton poplin treated under otherwise identical conditions remains virtually undyed.

EXAMPLE 6

A paper is printed by rotary screen printing with an ink which consists of 30 parts of the dye of the formula

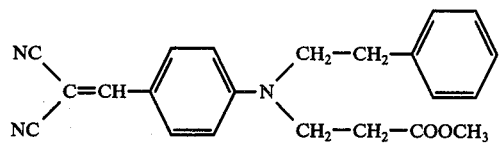

30 parts of magnesium chloride hydrate, 340 parts of water and 400 parts of a 10% strength starch ether thickener and the print is dried.

A polyester/cotton union fabric according to Example 1 is padded with a liquor comprising 50 parts of hexamethylolmelamine tetramethyl ether, 30 parts of N,N'-dimethoxymethyl-4-methoxy-5,5-dimethyl-propyleneurea and 920 parts of water (liquor pick-up 80%) and is dried at 100° C.

The printed paper is placed with the printed side on the treated fabric and the combination is treated in a heated press for 30 seconds at 220° C under 5 kg/cm², with the paper facing the heated part of the press. A deeply colored, level tone-on-tone print having very good fastness to light, washing and dry cleaning is obtained.

If a non-impregnated fabric is used and in other respects the above procedure is followed, only the polyester constituent of the fabric is dyed and the print is uneven and significantly paler.

Similar results are achieved if the above propyleneurea derivative is replaced by half the amount of a carbamate of the formula $HO(C_2H_4O)_8 CH_2CH_2O-CONH_2$.

EXAMPLE 7

A paper is printed by rotary screen printing with an ink which consists of 30 parts of the dye of the formula

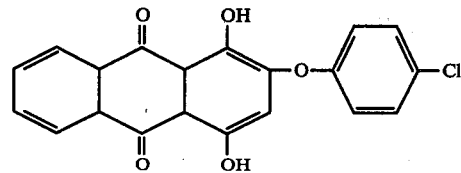

370 parts of water, 400 parts of a 10% strength locust bean ether thickener and 200 parts of a 10% strength starch ether thickener, and the print is dried. Thereafter the back of the same paper is printed with a print paste which consists of 50 parts of maleic acid, 350 parts of water, 400 parts of a 10% strength locust bean ether thickener and 200 parts of a 10% strength starch ether thickener, so as to apply 20 g of print paste per square meter, and is dried; the product constitutes the transfer.

A cotton velour weighing 250 g per square meter is impregnated with a liquor which consists of 100 parts of a highly methylolated melamine etherified with methanol, 50 parts of methoxyethyl carbamate and 850 parts of water (liquor pick-up 100%) and is dried at 120° C.

The transfer is placed with the color-printed side on the pile face of the velour and the combination is treated in a transfer calender at 220° C, with a residence time of 40 seconds.

A deeply colored print which is fast to washing and dry cleaning is obtained.

If untreated cotton velour is used and otherwise the same procedure is followed, the surface of the velour is only slightly dyed after the transfer process.

If, prior to the transfer process, a second transfer manufactured according to Example 3 (transfer 1 from the said Example) is taken, and placed with the printed side on the back of the impregnated cotton velour, and in other respects the same procedure is followed, differing deeply colored prints which are fast to washing and dry cleaning are obtained, in a single pass, respectively on the front and back of the velour.

EXAMPLE 8

A paper which contains — due to its process of manufacture — about 2 g/m² of tartaric acid is gravure-printed with an ink which consists of 6 parts of the dye C.I. No. 11,005, 20 parts of a styrene polymer and 79 parts of toluene, and the print is dried, thus giving the transfer.

A cotton knitted fabric weighing 140 g per square meter is impregnated with a liquor which consists of 75 parts of a highly methylolated melamine etherified with methanol, 75 parts of N,N'-dimethoxymethyl-4,5-dimethoxyethyleneurea and 850 parts of water. The liquor pick-up is 100%. The impregnated knitted fabric is dried at 110° C.

The transfer is placed with the printed side on the knitted fabric and the combination is treated for 40 seconds in a transfer calender at 220° C.

A deeply colored print which is fast to washing and dry cleaning is obtained.

If an untreated knitted cotton fabric is used and in other respects the same procedure is followed, the surface of the knitted fabric is only dyed slightly.

We claim:

1. A process for the transfer printing and durable fixing of a sublimable dye or optical brightener from a transfer paper onto a cellulosic fabric, said process comprising:
impregnating the fabric to be printed with an aqueous solution of a cross-linking agent consisting essentially of at least one polyfunctional etherified compound selected from the group consisting of ureas, melamines and carbamates which bear at least two methyl, ethyl, propyl or butyl ether groups, said etherified compound being both a solvent for said dye or optical brightener and also being crosslinkable with cellulose;
drying the impregnated fabric; and
then printing said fabric by sublimation at an elevated temperature from a paper transfer containing said dye or optical brightener in the presence of a cross-linking catalyst selected from the group consisting of volatile acids and the metal and ammonium salts of said volatile acids, said catalyst also being applied to the fabric from a paper transfer.

2. A process as claimed in claim 1 wherein said cross-linking agent consists essentially of a compound selected from the group consisting of the methylol ethers of said ureas, melamines and carbamates.

3. A process as claimed in claim 1 wherein said cross-linking agent consists essentially of a mixture of a melamine etherified with methanol and methoxyethyl carbamate.

4. A process as claimed in claim 1 wherein said catalyst is selected from the group consisting of ammonium chloride, magnesium chloride and maleic acid.

5. A process as claimed in claim 1 wherein said catalyst is applied to the fabric from the same paper transfer which contains said dye or optical brightener.

6. A process as claimed in claim 5 wherein said catalyst is applied from the back side of the paper transfer containing said dye or optical brightener on its front printing side.

7. A process as claimed in claim 1, wherein the dyes of the formulae

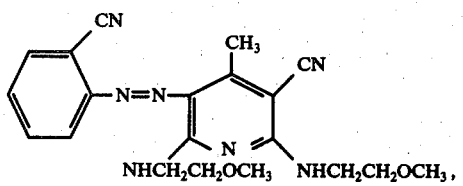 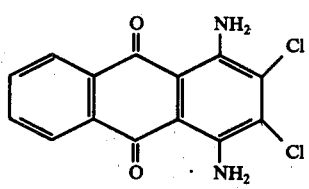

or 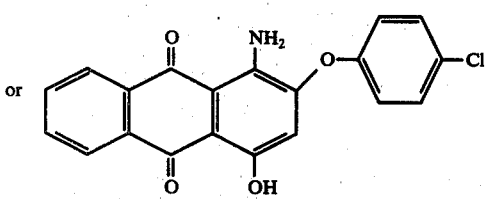

are used for said transfer printing.

8. A process for the transfer printing and durable fixing of a sublimable dye or optical brightener from a transfer paper onto a cellulose fabric, said process comprising:
impregnating the fabric to be printed with an aqueous solution of a cross-linking agent consisting essentially of at least one polyfunctional etherified compound selected from the group consisting of ureas, melamines and carbamates which bear at least two methyl, ethyl, propyl or butyl ether groups, said etherified compound being both a solvent for said dye or optical brightener and also being crosslinkable with cellulose;
drying the impregnated fabric; and
then printing said fabric by sublimation at an elevated temperature from a paper transfer containing said dye or optical brightener in the presence of a cross-linking catalyst selected from the group consisting of ammonium chloride, magnesium chloride, maleic acid, ammonium nitrate, zinc nitrate, magnesium nitrate, triethanol ammonium chloride, tributylammonium chloride, 1,3-diaminopropanol hydrochloride, ammonium thiocyanate, acetic acid, tartaric acid and fumaric acid, said catalyst also being applied to the fabric from a paper transfer.

* * * * *